US011006062B2

(12) United States Patent
Wang

(10) Patent No.: US 11,006,062 B2
(45) Date of Patent: May 11, 2021

(54) PIXEL SENSING CIRCUIT AND DRIVING METHOD THEREOF, IMAGE SENSOR AND ELECTRONIC DEVICE

(71) Applicants: Beijing BOE Technology Development Co., Ltd., Beijing (CN); BOE Technology Group Co., Ltd., Beijing (CN)

(72) Inventor: Zhiliang Wang, Beijing (CN)

(73) Assignees: BEIJING BOE TECHNOLOGY DEVELOPMENT CO., LTD., Beijing (CN); BOE TECHNOLOGY GROUP CO., LTD., Beijing (CN)

(*) Notice: Subject to any disclaimer, the term of this patent is extended or adjusted under 35 U.S.C. 154(b) by 17 days.

(21) Appl. No.: 16/515,514

(22) Filed: Jul. 18, 2019

(65) Prior Publication Data

US 2020/0162688 A1    May 21, 2020

(30) Foreign Application Priority Data

Nov. 20, 2018  (CN) .......................... 201811386119.1

(51) Int. Cl.
*H04N 5/225*    (2006.01)
*H04N 5/369*    (2011.01)
*H04N 5/374*    (2011.01)

(52) U.S. Cl.
CPC .......... *H04N 5/3698* (2013.01); *H04N 5/374* (2013.01)

(58) Field of Classification Search
CPC ................................................. H04N 5/37452
See application file for complete search history.

(56) References Cited

U.S. PATENT DOCUMENTS

| | | | | |
|---|---|---|---|---|
| 9,888,197 B1* | 2/2018 | Hynecek | ................ | H04N 5/363 |
| 10,484,618 B1* | 11/2019 | Do | ..................... | H04N 5/37452 |
| 2001/0045508 A1* | 11/2001 | Dierickx | .............. | H04N 5/3651 |
| | | | | 250/208.1 |
| 2002/0000508 A1* | 1/2002 | Muramatsu | ........ | H04N 5/35581 |
| | | | | 250/208.1 |
| 2003/0146389 A1* | 8/2003 | Busse | .................... | H04N 5/361 |
| | | | | 250/370.09 |
| 2004/0036643 A1* | 2/2004 | Bock | .................. | H04N 5/37455 |
| | | | | 341/155 |

(Continued)

*Primary Examiner* — Twyler L Haskins
*Assistant Examiner* — Dwight Alex C Tejano
(74) *Attorney, Agent, or Firm* — Westman, Champlin & Koehler, P.A.

(57) ABSTRACT

The embodiments of the present disclosure provide a pixel sensing circuit. The photoelectric conversion sub-circuit is configured to collect an incident light, and generate an electrical signal based on the incident light collected. The first resetting sub-circuit is configured to write a first power supply voltage to the signal collection point. The threshold compensation sub-circuit is configured to obtain a threshold voltage of the conversion transistor and a second controlling signal from the second controlling signal line, generate a compensation voltage according to the threshold voltage, and write the compensation voltage to the signal collection point. The conversion transistor is configured to output a current signal at the second electrode according to a voltage at the signal collection point. The selection sub-circuit is configured to output a current signal from the second electrode of the conversion transistor.

11 Claims, 6 Drawing Sheets

(56) References Cited

U.S. PATENT DOCUMENTS

| | | | | |
|---|---|---|---|---|
| 2006/0221667 A1* | 10/2006 | Ogura | ............... | H01L 27/14656 |
| | | | | 365/149 |
| 2007/0131991 A1* | 6/2007 | Sugawa | ............ | H01L 27/14609 |
| | | | | 257/292 |
| 2009/0032852 A1* | 2/2009 | Song | ...................... | H04N 3/155 |
| | | | | 257/292 |
| 2012/0326008 A1* | 12/2012 | McKee | .............. | H04N 5/37452 |
| | | | | 250/208.1 |
| 2013/0314573 A1* | 11/2013 | Tsukimura | ........ | H01L 27/14605 |
| | | | | 348/302 |
| 2016/0049432 A1* | 2/2016 | Otaka | ............... | H01L 27/14643 |
| | | | | 348/308 |
| 2016/0134789 A1* | 5/2016 | Inoue | ................ | H04N 5/37452 |
| | | | | 348/374 |
| 2017/0070691 A1* | 3/2017 | Nishikido | .......... | H04N 5/35581 |
| 2017/0078606 A1* | 3/2017 | Ohmaru | ............. | H04N 5/35581 |

\* cited by examiner

US 11,006,062 B2

PIXEL SENSING CIRCUIT AND DRIVING METHOD THEREOF, IMAGE SENSOR AND ELECTRONIC DEVICE

CROSS-REFERENCE TO RELATED APPLICATION(S)

This application claims the priority of Chinese Patent Application No. 201811386119.1 filed on Nov. 20, 2018, the entire contents of which are hereby incorporated by reference.

TECHNICAL FIELD

The present disclosure relates to the field of image sensing, and in particular, to a pixel sensing circuit and a driving method thereof, an image sensor, and an electronic device.

BACKGROUND

An active pixel sensor (APS) is used to convert an optical signal into an electrical signal. The active pixel sensor may include a charge coupled device (CCD) type APS and a complementary metal oxide semiconductor (CMOS) type APS. The CMOS type APS can be fabricated on a silicon substrate by a semiconductor manufacturing process, so that the CMOS type APS can be easily integrated into a peripheral system having an amplification circuit and a signal processing circuit.

SUMMARY

Embodiments of the present disclosure provide a pixel sensing circuit and a method for driving the same, and an image sensor and an electronic device including the pixel sensing circuit.

According to an aspect of the embodiments of the present disclosure, there is provided a pixel sensing circuit, comprising:

a photoelectric conversion sub-circuit electrically coupled to a signal collection point and configured to collect an incident light, and generate an electrical signal based on the incident light collected, so as to charge the signal collection point;

a first resetting sub-circuit electrically coupled to a first controlling signal line and a first power supply terminal and configured to write a first power supply voltage from the first power supply terminal to the signal collection point, under a control of a first controlling signal from the first controlling signal line;

a conversion transistor having a control electrode electrically coupled to the signal collection point, a first electrode electrically coupled to the first power supply terminal, and a second electrode, wherein the conversion transistor is configured to output a current signal at the second electrode according to a voltage at the signal collection point;

a threshold compensation sub-circuit electrically coupled to the first controlling signal line, a second controlling signal line, a second power supply terminal, and the second electrode of the conversion transistor, wherein the threshold compensation sub-circuit is configured to obtain a threshold voltage of the conversion transistor under a control of the first controlling signal and a second controlling signal from the second controlling signal line, generate a compensation voltage according to the threshold voltage, and write the compensation voltage to the signal collection point, wherein the compensation voltage is given by V0=V1+Vth, V1 refers to a second power supply voltage, and Vth refers to the threshold voltage; and a selection sub-circuit electrically coupled to the second electrode of the conversion transistor and a third controlling signal line, and configured to output a current signal from the second electrode of the conversion transistor under a control of a third controlling signal from the third controlling signal line.

For example, the first resetting sub-circuit comprises a first transistor having a control electrode electrically coupled to the first controlling signal line, a first electrode coupled to the first power supply terminal and a second electrode electrically coupled to the signal collection point.

For another example, the threshold compensation sub-circuit comprises: a second transistor, a third transistor, and a capacitor; wherein the capacitor has a first terminal coupled to the signal collection point, and a second terminal coupled to a first electrode of the second transistor and a first electrode of the third transistor; the second transistor has a control electrode electrically coupled to the first controlling signal line, and a second electrode electrically coupled to the second electrode of the conversion transistor; the third transistor has a control electrode electrically coupled to the second controlling signal line, and a second electrode electrically coupled to the second power supply terminal.

For another example, the selection sub-circuit comprises: a fourth transistor having a control electrode electrically coupled to the third controlling signal line, a first electrode electrically coupled to the second electrode of the conversion transistor, and a second electrode electrically coupled to an image processor.

For another example, the pixel sensing circuit further comprises: a second resetting sub-circuit electrically coupled to the second electrode of the conversion transistor, a fourth controlling signal line, and a third power supply terminal, and configured to write a third power supply voltage from the third power supply terminal to the second electrode of the conversion transistor under a control of a fourth controlling signal from the fourth controlling signal line.

For another example, the second resetting sub-circuit comprises: a fifth transistor having a control electrode electrically coupled to the fourth controlling signal line, a first electrode electrically coupled to the second electrode of the conversion transistor, and a second electrode electrically coupled to the third power supply terminal.

According to another aspect of the embodiments of the present disclosure, there is further provided an image sensor, comprising the pixel sensing circuit in accordance with the above embodiments; and an image processor.

According to yet another aspect of the embodiments of the present disclosure, there is provided an electronic device, comprising the image sensor in accordance with the above embodiments.

According to still another aspect of the embodiments of the present disclosure, there is provided a method of driving the pixel sensing circuit in accordance with the above embodiments, comprising:

during a first phase, writing, by the first resetting sub-circuit, the first power supply voltage to the signal collection point, under the control of the first controlling signal; and resetting, by the selection sub-circuit, the second electrode of the conversion transistor, under the control of the third controlling signal;

during a second phase, obtaining, by the threshold compensation sub-circuit, the threshold voltage for the conversion transistor, under the control of the first controlling signal and the second controlling signal; generating the compensation voltage according to the threshold voltage; and writing the compensation voltage to the signal collection point;

during a third phase, collecting, by the photoelectric conversion sub-circuit, the incident light, and generating the electrical signal according to the incident light collected, so as to charge the signal collection point; and during a fourth phase, outputting, by the conversion transistor, the current signal according to the voltage at the signal collection point; and outputting, by the selection sub-circuit, the current signal from the conversion transistor, under the control of the third controlling signal.

For example, the method further comprises: during the second phase, disconnecting, by the selection sub-circuit, the second electrode of the conversion transistor from the image processor, under the control of the third controlling signal.

According to another aspect of the embodiments of the disclosure, there is provided a method of driving the pixel sensing circuit in accordance with the above embodiments, comprising:

during a first phase, writing, by the first resetting sub-circuit, the first power supply voltage to the signal collection point, under the control of the first controlling signal; writing, by the second resetting sub-circuit, the third power supply voltage to the second electrode of the conversion transistor, under the control of the fourth controlling signal; disconnecting, by the selection sub-circuit, the second electrode of the conversion transistor from the image processor, under the control of the third controlling signal;

during a second phase, obtaining, by the threshold compensation sub-circuit, the threshold voltage for the conversion transistor, under the control of the first controlling signal and the second controlling signal; generating the compensation voltage according to the threshold voltage, and writing the compensation voltage to the signal collection point;

during a third phase, collecting, by the photoelectric conversion sub-circuit, the incident light, and generating the electrical signal according to the incident light collected, so as to charge the signal collection point;

during a fourth phase, outputting, by the conversion transistor, the current signal according to the voltage at the signal collection point; and connecting the second electrode of the conversion transistor with the image processor, under the control of the third controlling signal, so as to output the current signal from the conversion transistor.

According to another aspect of the embodiments of the disclosure, there is provided a method of driving the pixel sensing circuit of claim 6, comprising:

during a first phase, writing, by the first resetting sub-circuit, the first power supply voltage to the signal collection point, under the control of the first controlling signal; writing, by the second resetting sub-circuit, the third power supply voltage to the second electrode of the conversion transistor, under the control of the fourth controlling signal;

during a second phase, obtaining, by the threshold compensation sub-circuit, the threshold voltage for the conversion transistor, under the control of the first controlling signal and the second controlling signal; generating the compensation voltage according to the threshold voltage, and writing the compensation voltage to the signal collection point;

during a third phase, collecting, by the photoelectric conversion sub-circuit, the incident light, and generating the electrical signal according to the incident light collected, so as to charge the signal collection point;

during a fourth phase, outputting, by the conversion transistor, the current signal according to the voltage at the signal collection point; and outputting, by the selection sub-circuit, the current signal from the conversion transistor, under the control of the third controlling signal.

DETAILED DESCRIPTION

In order to enable a better understanding of the technical solutions of the present disclosure for those skilled in the art, a pixel sensing circuit and a method for driving the same, an image sensor, and an electronic device according to the present disclosure are described in detail below with reference to the accompanying drawings.

Figure 1:
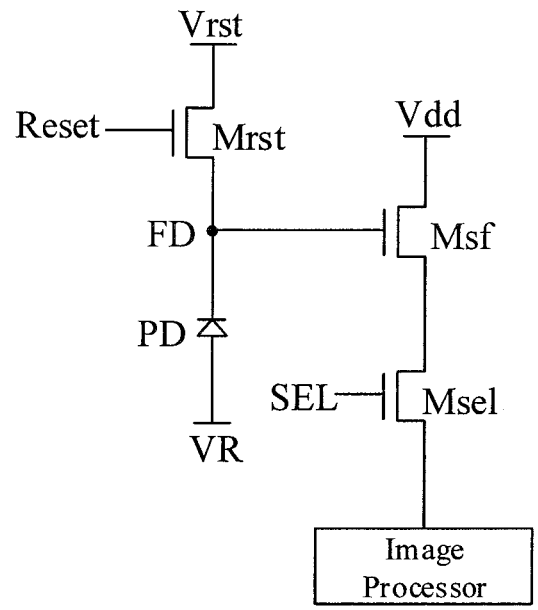
FIG. 1 shows a schematic diagram illustrating a circuit structure of a pixel sensing circuit.

A CMOS image sensor may include a plurality of pixel units (Pixels), and each of the pixel units is provided with a corresponding pixel sensing circuit. FIG. 1 shows a schematic diagram illustrating a circuit structure of a pixel sensing circuit. As shown in FIG. 1, the pixel sensing circuit may include a resetting transistor Mrst, a photodiode PD, a conversion transistor Msf, and a selection transistor Msel, wherein a control electrode of the resetting transistor Mrst, the first terminal of the photodiode PD, and a control electrode of the conversion transistor Msf are coupled to a signal collection point FD. The photodiode PD collects an incident light and generates an electrical signal based on the incident light collected. The conversion transistor Msf outputs a corresponding current signal according to a voltage signal at the signal collection point PD. The current signal is delivered by the selection transistor Msel to an external image processor, so as to determine the intensity of the incident light based on the current signal by the external image processor.

Figure 2:
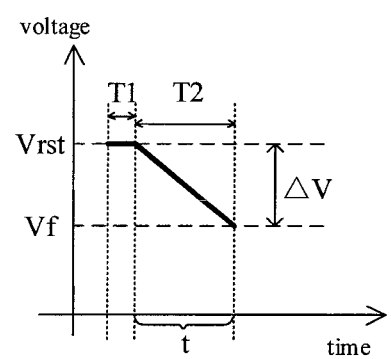
FIG. 2 shows a schematic waveform diagram illustrating a voltage at a signal collection point in FIG. 1 as a function of time.

FIG. 2 shows a schematic waveform diagram illustrating a voltage at a signal collection point in FIG. 1 as a function of time. As shown in FIG. 2, during a resetting phase T1, the resetting transistor Mrst is turned on in response to a control of a resetting signal Reset, and a predetermined resetting voltage Vrst provided by the resetting terminal is written to the signal collection point, so as to reset the voltage at the signal collection point FD.

During an exposure sampling phase T2, the resetting transistor Mrst is turned off, and the photodiode PD collects the incident light to generate a corresponding electrical signal for charging the signal collection point FD. The duration of T2 is represented by t, which can be set by default. The voltage at the signal collection point FD decreases gradually. If it is assumed that the voltage at the photodiode PD is Vf at the end of the exposure sampling phase T2, the voltage variation ΔV at the signal collection point FD can be expressed by ΔV=Vrst−Vf, the voltage variation ΔV corresponding to the intensity of the incident light. The conversion transistor Msf operates in a saturated state and outputs a corresponding current signal according to the voltage at the signal collection point FD. The selection transistor Msel is turned on in response to the selection controlling signal SEL, so as to output the current signal from the conversion transistor Msf to, for example, the external image processor. The image processor can calculate the voltage variation ΔV at the signal collection point FD during the exposure sampling phase T2, based on the current signal, thereby obtaining the intensity of the incident light.

However, with an increasing usage time, the threshold voltage of the conversion transistor Msf may drift. Thus, even if the voltage at the signal collection point FD is the same, the current from the conversion transistor Msf may be different, causing the output of the conversion transistor Msf not to be in consistent with the optical signal collected accurately.

Figure 3:
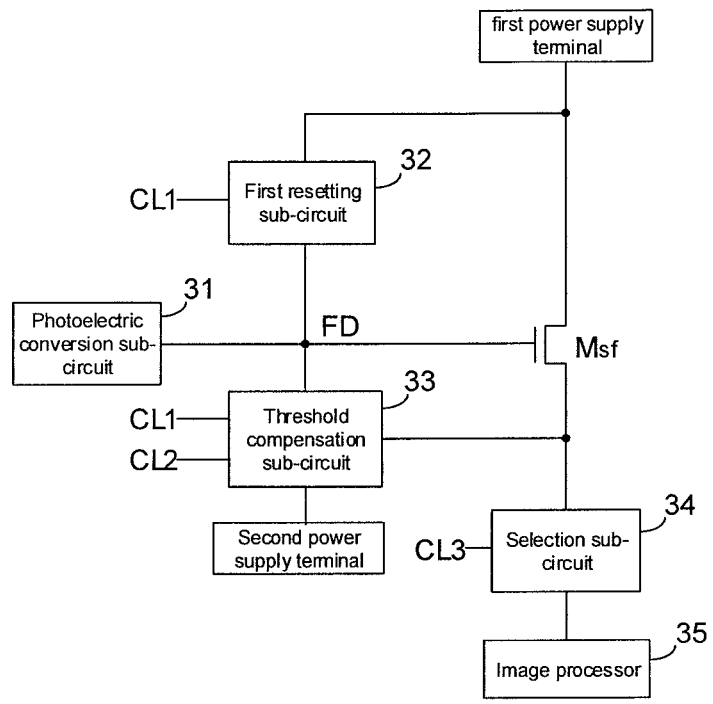
FIG. 3 shows a schematic diagram illustrating the circuit structure of a pixel sensing circuit according to an embodiment of the present disclosure.

FIG. 3 shows a schematic diagram illustrating the circuit structure of a pixel sensing circuit according to an embodiment of the present disclosure. As shown in FIG. 3, the pixel sensing circuit may include a photoelectric conversion sub-circuit 31, a first resetting sub-circuit 32, a threshold compensation sub-circuit 33, a selection sub-circuit 34, and a conversion transistor Msf. The photoelectric conversion sub-circuit 31 is electrically coupled to the first resetting sub-circuit 32 and a control electrode of the conversion transistor Msf, and the threshold compensation sub-circuit 33 is electrically coupled to to the signal collection point FD.

The photoelectric conversion sub-circuit 31 can be configured to collect an incident light, and generate an electrical signal based on the incident light collected, so as to charge the signal collection point FD. In various embodiments of the present disclosure, the description is made by taking the photoelectric conversion sub-circuit comprising a photodiode (PD) as an example, wherein the photodiode PD has an anode electrically coupled to the power supply terminal that supplies the voltage VR, and a cathode electrically coupled to the output terminal of the photoelectric conversion sub-circuit 31. Certainly, the photoelectric conversion sub-circuit in the present disclosure may also be other devices having a photoelectric conversion function.

The first resetting sub-circuit 32 is electrically coupled to a first controlling signal line CL1 and a first power supply terminal. The first resetting sub-circuit 32 is configured to write a first power supply voltage from the first power supply terminal to the signal collection point FD, under a control of a first controlling signal from the first controlling signal line CL1.

The threshold compensation sub-circuit 33 is electrically coupled to the first controlling signal line CL1, a second controlling signal line CL2, a second power supply terminal, and the second electrode of the conversion transistor Msf. The threshold compensation sub-circuit 33 is configured to obtain a threshold voltage of the conversion transistor Msf under a control of the first controlling signal and a second controlling signal from the second controlling signal line CL2, generate a compensation voltage according to the threshold voltage, and write the compensation voltage to the signal collection point FD, wherein the compensation voltage is given by $V_0=V_1+V_{th}$, $V_1$ refers to a second power supply voltage, and $V_{th}$ refers to the threshold voltage of the conversion transistor Msf.

The selection sub-circuit 34 is electrically coupled to the second electrode of the conversion transistor Msf and a third controlling signal line CL3. The selection sub-circuit 34 is configured to control whether to output the current signal from the second electrode of the conversion transistor Msf to the image processor 35 or not, under a control of a third controlling signal from the third controlling signal line CL3.

The conversion transistor Msf has a first electrode coupled to the first power supply terminal, and is configured to output the current signal corresponding to the voltage at the signal collection point FD.

The operation of the pixel sensing circuit according to the embodiment of the present disclosure may include the following four phases: a first phase S1, a second phase S2, a third phase S3, and a fourth phase S4.

During the first phase S1, under the control of the first controlling signal, the first resetting sub-circuit 32 writes the first power supply voltage to the signal collection point FD, so as to reset the voltage at the signal collection point FD. Further, under the control of the third controlling signal, the selection sub-circuit 34 connects the second electrode of the conversion transistor Msf and the image processor 35, so as to write the predetermined resetting voltage supplied from the image processor 35 to the second electrode of the conversion transistor Msf, thereby resetting the second electrode of the conversion transistor Msf. Therefore, the first phase can be referred to as a "resetting phase."

During the second phase S2, under the control of the third controlling signal, the selection sub-circuit 34 disconnects the second electrode of the conversion transistor Msf from the image processor 35. Under the control of the first controlling signal and the second controlling signal, the threshold compensation sub-circuit 33 obtains the threshold voltage of the conversion transistor Msf, generates the compensation voltage according to the threshold voltage, and writes the compensation voltage to the signal collection point FD, wherein the compensation voltage is given by $V_0=V_1+V_{th}$, $V_1$ refers to a second power supply voltage, and $V_{th}$ refers to the threshold voltage of the conversion transistor Msf. Therefore, the second phase can be referred to as a "threshold compensation phase."

During the third phase S3, the photoelectric conversion sub-circuit 31 collects the incident light and generates the electrical signal corresponding to the incident light collected, so as to charge the signal collection point FD with the electrical signal. In this process, the voltage variation at the signal collection point FD, i.e., the difference between the voltage after being charged and the voltage before being charged, is expressed by ΔV. Thus, at the end of the third phase S3, the voltage at the signal collection point FD will be $V_1+V_{th}+\Delta V$. Therefore, the third phase can be referred to as an "exposure sampling phase." In addition, those skilled in the art can understand that the duration of the third phase S3 can be preset according to actual needs.

During the fourth phase S4, under the control of the third controlling signal, the selection sub-circuit 34 connects the second electrode of the conversion transistor Msf and the image processor 35, and the conversion transistor Msf outputs a corresponding current signal according to the voltage at the signal collection point FD. Therefore, the fourth phase can be referred to as an "outputting phase." Among the others, if it is assumed that the predetermined resetting voltage provided by the image processor 35 is VSS, the gate-source voltage of the conversion transistor Msf will be Vgs=$V_1$+$V_{th}$+ΔV−VSS. Thus, it can be obtained according to the saturation driving current equation:

$$I = K*(Vgs - Vth)^2$$
$$= K*(V1 + Vth + \Delta V - VSS - Vth)^2$$
$$= K*(V1 + \Delta V - VSS)^2$$

wherein K is a constant determined by the channel size and electrical characteristics of the conversion transistor Msf. As can be seen from the above equation, the magnitude of the current output from the conversion transistor Msf is related to the second power supply voltage V1, the predetermined resetting voltage VSS supplied from the image processor 35, and the voltage variation ΔV at the signal collection point FD during the third phase S3, but independent of the threshold voltage Vth of the conversion transistor Msf. Therefore, the pixel sensing circuit according to an embodiment of the present disclosure can alleviate the problem that the outputs of source follower transistors are not uniform due to their own difference.

For example, the first power supply terminal and the second power supply terminal may be the same power supply terminal, i.e., V1 is equal to VDD, thereby reducing the number of power supply terminals required by the pixel sensing circuit.

Figure 4:
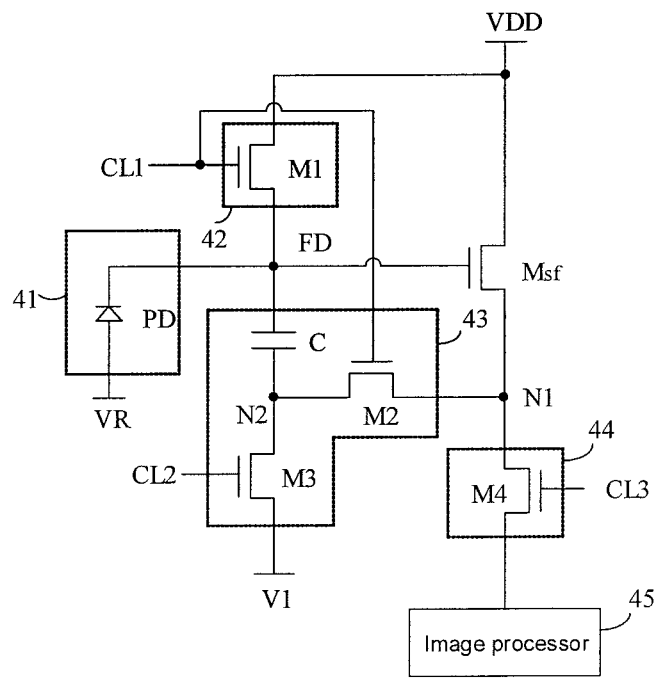
FIG. 4 shows a schematic diagram illustrating the circuit structure of the pixel sensing circuit according to another embodiment of the present disclosure.

FIG. 4 shows a schematic diagram illustrating the circuit structure of the pixel sensing circuit according to another embodiment of the present disclosure.

For example, the first resetting sub-circuit 42 may include a first transistor M1 having a control electrode electrically coupled to the first controlling signal line CL1, a first electrode coupled to the first power supply terminal and a second electrode electrically coupled to the signal collection point FD.

For example, the threshold compensation sub-circuit 43 may include a second transistor M2, a third transistor M3, and a capacitor C. The capacitor C has a first terminal coupled to the signal collection point FD, and a second terminal coupled to a first electrode of the second transistor M2 and a first electrode of the third transistor M3. The second transistor M2 has a control electrode electrically coupled to the first controlling signal line CL1, and a second electrode electrically coupled to the second electrode of the conversion transistor Msf. The third transistor M3 has a control electrode electrically coupled to the second controlling signal line CL2, and a second electrode electrically coupled to the second power supply terminal.

For example, the selection sub-circuit 44 can include a fourth transistor M4 having a control electrode electrically coupled to the third controlling signal line CL3, a first electrode electrically coupled to the second electrode of the conversion transistor Msf, and a second electrode electrically coupled to an image processor 45.

According to an embodiment of the present disclosure, the first to fourth transistors M1 to M4 are each used as a switching transistor. The switching transistor can include three electrodes: a gate, a source, and a drain, wherein the source and the drain are structurally symmetrical, and thus interchangeable as desired. In the present disclosure, the control electrode refers to the gate of the transistor, one of the first and second electrodes being the source and the other being the drain.

In addition, the transistors can be classified into N-type transistors and P-type transistors depending on their characteristics. For an N-type transistor, the turning-on voltage is at a high level, and the turning-off voltage is at a low level. For a P-type transistor, the turning-on voltage is at a low level, and the turning-off voltage is at a high level.

Hereinafter, the exemplary description is made by taking the first to the fourth transistors M1 to M4 and the conversion transistor Msf all being N-type transistors as an example. The first power supply voltage from the first power supply terminal is VDD, the second power supply voltage from the second power supply terminal is $V_1$, and the predetermined resetting voltage provided by the image processor 5 is VSS.

The operation of the pixel sensing circuit according to the embodiment of the present disclosure will be described in detail below with reference to the accompanying drawings.

Figure 5:
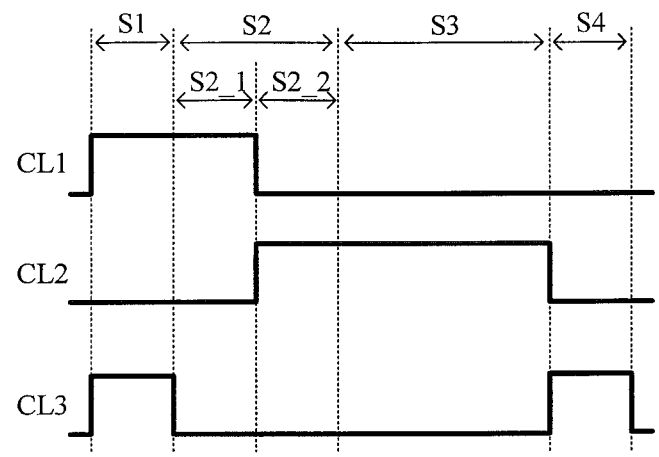
FIG. 5 shows a timing chart for the pixel sensing circuit shown in FIG. 4.

FIG. 5 shows a timing chart for the pixel sensing circuit shown in FIG. 4. As shown in FIG. 5, the operation of the pixel sensing circuit may include the following four phases: a first phase S1, a second phase S2, a third phase S3, and a fourth phase S4.

During the first phase S1, the first controlling signal provided by the first controlling signal line CL1 is at a high level, and the second controlling signal provided by the second controlling signal line CL2 is at a low level, and the third controlling signal line CL3 provided by the third controlling signal CL3 is at a high level. At this time, the first transistor M1, the second transistor M2, and the fourth transistor M4 are all turned on, and the third transistor M3 is turned off.

Since the first transistor M1 is turned on, the first power supply voltage can be written to the signal collection point FD through the first transistor M1, so as to reset the voltage at the signal collection point FD. In addition, since the second transistor M2 and the fourth transistor M4 are turned on, the predetermined resetting voltage VSS can be written to a first node N1 (that is, the second electrode of the conversion transistor Msf) through the fourth transistor M4, and to the second node (that is, the second terminal of the capacitor C) through the fourth transistor M4 and the second transistor M2, thereby resetting the second electrode of the conversion transistor Msf and the capacitor.

At the end of the first phase S1, the voltage at the signal collection point FD is VDD, the voltage at the first node N1 is VSS, the voltage at the second node N2 is VSS, and the voltage across the capacitor C is VDD−VSS.

The second phase S2 may include a threshold voltage acquisition sub-phase S2_1 and a compensation voltage outputting sub-phase S2_2.

During the threshold voltage acquisition sub-stage S2_1, the first controlling signal provided by the first controlling signal line CL1 is at a high level, the second controlling signal provided by the second controlling signal line CL2 is at a low level, and the third controlling signal provided by the third controlling signal line CL3 is at a low level. The first transistor M1 and the second transistor M2 are both turned on, and the third transistor M3 and the fourth transistor M4 are both turned off.

Since the fourth transistor M4 is turned off and the second transistor M2 is turned on, the current from the second electrode of the conversion transistor Msf starts charging the first node N1 and the second node N2. When the voltages at the first node N1 and the second node N2 rise to VDD−Vth, the conversion transistor Msf is turned off.

At the end of the threshold voltage acquisition sub-phase S2_1, the voltage at the signal collection point FD is VDD, the voltage at the first node N1 is VDD−Vth, the voltage at the second node N2 is VDD−Vth, and the voltage across the capacitor C is Vth. Therefore, it can be considered that the threshold voltage Vth is written into the capacitor C.

During the compensation voltage outputting sub-phase S2_2, the first controlling signal provided by the first controlling signal line CL1 is at a low level, the second controlling signal provided by the second controlling signal line CL2 is at a high level, and the third controlling signal line CL3 provided by the third controlling signal provided CL3 is at a low level. The first transistor M1, the second transistor M2, and the fourth transistor M4 are all turned off, and the third transistor M3 is turned on.

Since the first transistor M1 is turned off, the first node N1 is in a floating state. Since the third transistor M3 is turned on, the second power supply voltage V1 is written to the second node N2 through the third transistor M3. Thus, the voltage at the second node is V1. At this time, due to the bootstrap of the capacitor C (the voltage across the capacitor being unchanged), the voltage at the first node N1 hops from VDD to V1+Vth.

At the end of the compensation voltage outputting sub-phase S2_2, the voltage at the signal collection point FD is V1+Vth, the voltage at the first node N1 is VDD−Vth, the voltage at the second node N2 is V1, and the voltage across the capacitor C is Vth.

During the third phase S3, the first controlling signal provided by the first controlling signal line CL1 is at a low level, the second controlling signal provided by the second controlling signal line CL2 is at a high level, and the third controlling signal provided by the third controlling signal line CL3 is at a low level. At this time, the first transistor M1, the second transistor M2, and the fourth transistor M4 are all turned off, and the third transistor M3 is turned on.

Since the third transistor M3 is turned on, the voltage at the second node N2 is maintained at V1. The photoelectric conversion sub-circuit 41 collects the incident light and generates the electric charge, while charging the signal collection point FD. In this process, it is assumed that the voltage variation at the signal collection point FD, that is, the difference between the voltage after being charged and the voltage before being charged, is ΔV.

At the end of the third phase S3, the voltage at the signal collection point FD is V1+Vth+ΔV, the voltage at the first node N1 is VDD−Vth, and the voltage at the second node N2 is V1.

During the fourth phase S4, the first controlling signal provided by the first controlling signal line CL1 is at a low level, the second controlling signal provided by the second controlling signal line CL2 is at a low level, and the third controlling signal provided by the third controlling signal line CL3 is at a high level. The first transistor M1, the second transistor M2, and the third transistor M3 are all turned off, and the fourth transistor M4 is turned on.

Since the fourth transistor M4 is turned on, the voltage at the first node N1 becomes VSS again. The gate-source voltage of the conversion transistor Msf is expressed by Vgs=V1+Vth+ΔV−VSS. Thus, it can be obtained according to the saturation driving current equation:

$$I = K*(Vgs - Vth)^2$$
$$= K*(V1 + Vth + \Delta V - VSS - Vth)^2$$
$$= K*(V1 + \Delta V - VSS)^2$$

wherein K is a constant determined by the channel size and electrical characteristics of the conversion transistor Msf. As can be seen from the above equation, the magnitude of the current output from the conversion transistor Msf is related to the second power supply voltage V1, the predetermined resetting voltage VSS supplied from the image processor 45, and the voltage variation ΔV at the signal collection point FD during the third phase S3, but independent of the threshold voltage Vth of the conversion transistor Msf. Therefore, the pixel sensing circuit according to an embodiment of the present disclosure can alleviate the problem that the outputs of source follower transistors are not uniform due to their own difference.

It can be understood by those skilled in the art that each of the above transistors is an N-type transistor. In this case, the above transistors can be simultaneously prepared by using a transistor fabrication process once. However, the present disclosure is not limited thereto. In the embodiment of the present disclosure, each transistor can also be selectively replaced with a P-type transistor, which will not be described in detail herein.

Figure 6:
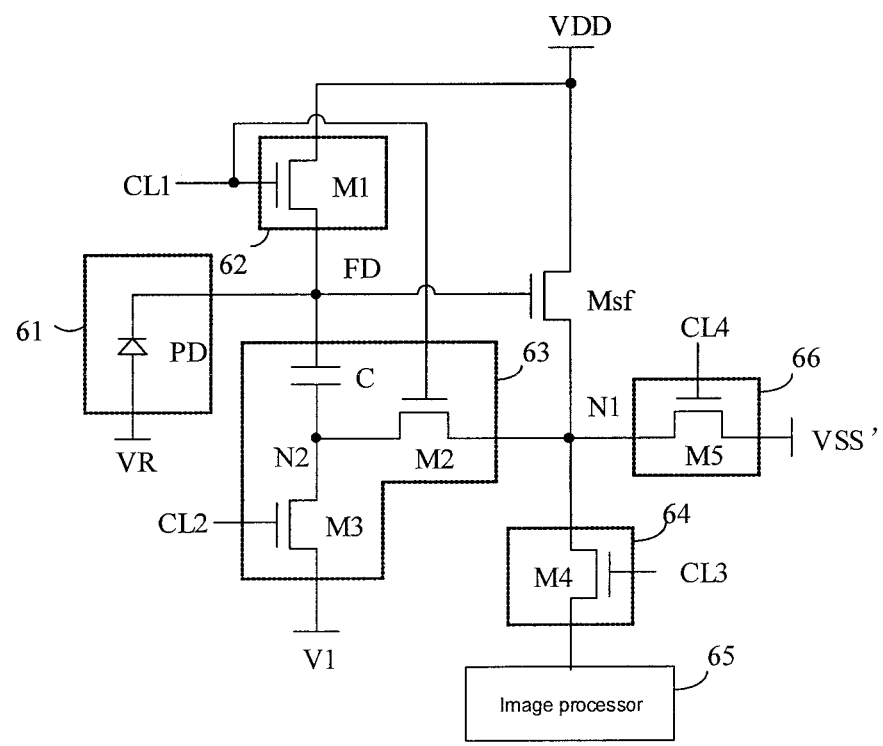
FIG. 6 shows a schematic diagram illustrating the circuit structure of the pixel sensing circuit according to still another embodiment of the present disclosure.

FIG. 6 shows a schematic diagram illustrating the circuit structure of the pixel sensing circuit according to still another embodiment of the present disclosure. As shown in FIG. 6, the pixel sensing circuit is different from the pixel sensing circuit in the foregoing embodiments in that the pixel sensing circuit shown in FIG. 6 includes not only the photoelectric conversion sub-circuit 61, the first resetting sub-circuit 62, the threshold compensation sub-circuit 63, the selection sub-circuit 64 and the conversion transistor Msf, but also includes a second resetting sub-circuit 66.

The second resetting sub-circuit 66 is electrically coupled to the second electrode of the conversion transistor Msf, a fourth controlling signal line CL4, and a third power supply terminal, and configured to write the third power supply voltage from the third power supply terminal to the second electrode of the conversion transistor Msf under a control of a fourth controlling signal from the fourth controlling signal line CL4.

For example, the second resetting sub-circuit 66 may include a fifth transistor M5 having a control electrode electrically coupled to the fourth controlling signal line CL4, a first electrode electrically coupled to the second electrode of the conversion transistor Msf, and a second electrode electrically coupled to the third power supply terminal.

In this embodiment, the third power supply voltage provided by the third power supply terminal may be VSS'.

Figure 7:
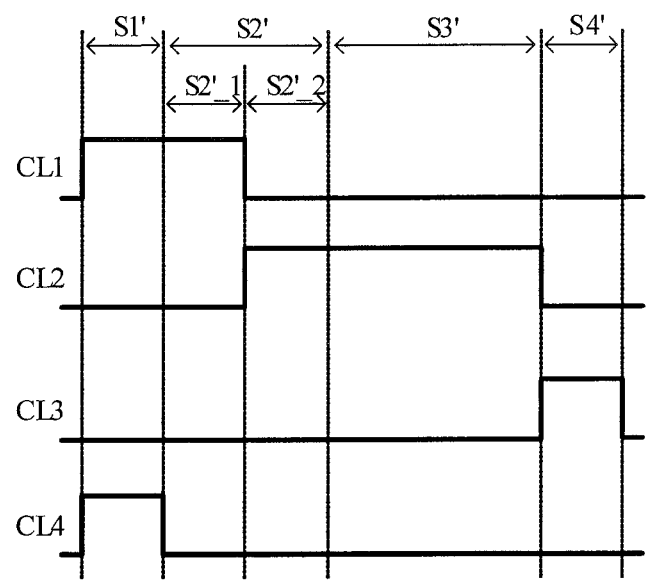
FIG. 7 shows a timing chart for the pixel sensing circuit shown in FIG. 6.

FIG. 7 shows a timing chart for the pixel sensing circuit shown in FIG. 6. As shown in FIG. 7, the operation of the pixel sensing circuit also includes the following four phases: a first phase S1', a second phase S2', a third phase S3', and a fourth phase S4'.

During the first phase S1', the first controlling signal provided by the first controlling signal line CL1 is at a high level, the second controlling signal provided by the second controlling signal line CL2 is at a low level, the third controlling signal provided by the third controlling signal line CL3 is at a low level, and the fourth controlling signal provided by the fourth controlling signal line CL4 is at a high level. The first transistor M1, the second transistor M2, and the fifth transistor M5 are all turned on, and the third transistor M3 and the fourth transistor M4 are both turned off.

Since the first transistor M1 is turned on, the first power supply voltage can be written to the signal collection point FD through the first transistor M1, so as to reset the voltage at the signal collection point FD. Since the fifth transistor M5 is turned on, the third power supply voltage VSS' is written to the first node through the fifth transistor M5, so as to reset the first node.

Unlike the foregoing embodiments, since the fourth transistor M4 is turned off, in the first phase S1', the current from the second electrode of the conversion transistor Msf cannot be outputted to the image processor 5, thereby preventing the image processor 5 from reading the signal improperly.

During the second phase S2', the fourth controlling signal provided by the fourth controlling signal line CL4 is switched from the high level to the low level.

The operation of the pixel sensing circuit of this embodiment during the second phase S2', the third phase S3' and the fourth phase S4' is the same as the operation of the pixel sensing circuit of the foregoing embodiments during the second phase S2 and the third phase S3 and the fourth phase S4, and thus will not be described in detail here.

Figure 8:
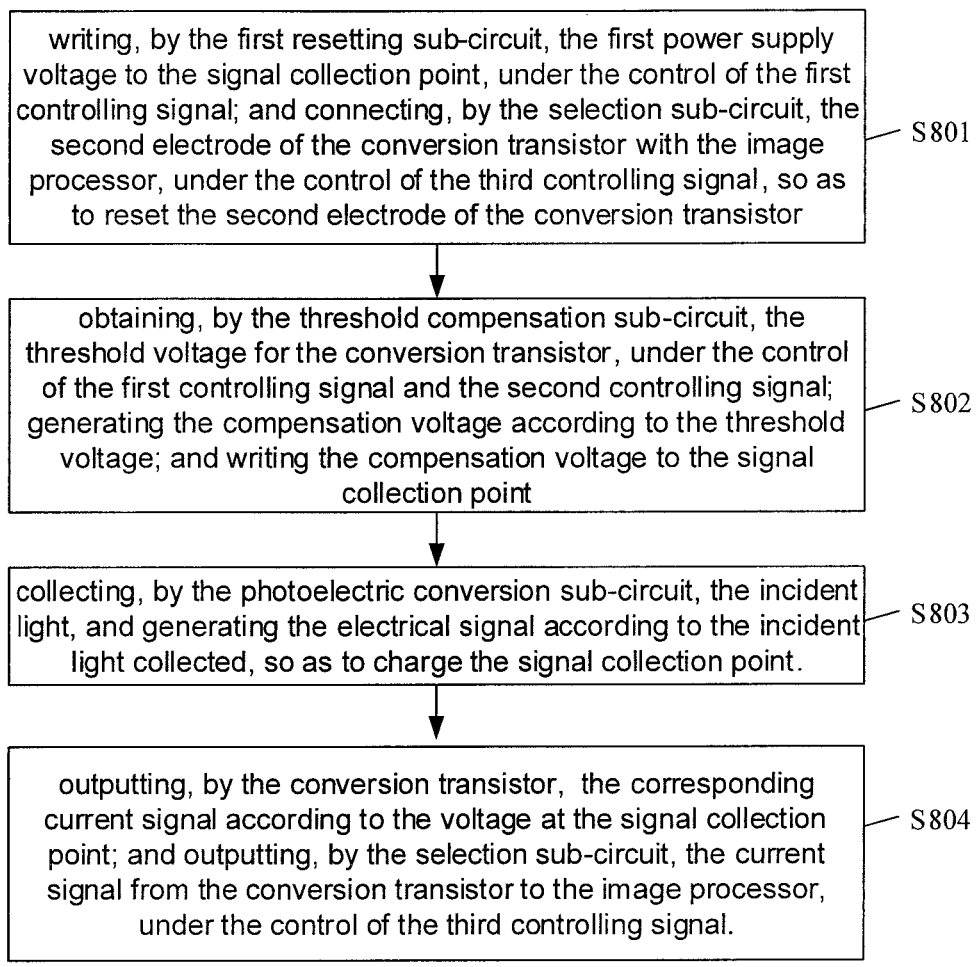
FIG. 8 shows a flow chart illustrating a method for driving the pixel sensing circuit according to an embodiment of the present disclosure.

FIG. 8 shows a flow chart illustrating a method for driving the pixel sensing circuit according to an embodiment of the present disclosure. As shown in FIG. 8, the pixel sensing circuit is implemented with the pixel sensing circuit according to any of the above embodiments, and the method may include following steps.

In step S801, the first resetting sub-circuit writes the first power supply voltage to the signal collection point, under the control of the first controlling signal; and the selection sub-circuit resets the second electrode of the conversion transistor, under the control of the third controlling signal.

In step S802, the threshold compensation sub-circuit obtains the threshold voltage for the conversion transistor, under the control of the first controlling signal and the second controlling signal; generates the compensation voltage according to the threshold voltage; and writes the compensation voltage to the signal collection point.

In addition, in step S802, the method further comprises disconnecting, by the selection sub-circuit, the second electrode of the conversion transistor from the image processor, under the control of the third controlling signal.

In step S803, the photoelectric conversion sub-circuit collects the incident light, and generates the electrical signal according to the incident light collected, so as to charge the signal collection point.

In step S804, the conversion transistor outputs the corresponding current signal according to the voltage at the signal collection point; and the selection sub-circuit connects the second electrode of the conversion transistor with the image processor, so as to output the current signal from the conversion transistor to the image processor, under the control of the third controlling signal.

The detailed description of the foregoing steps S801 to S804 can refer to the corresponding content in the foregoing embodiment, and thus, details are not described herein again.

Figure 9:
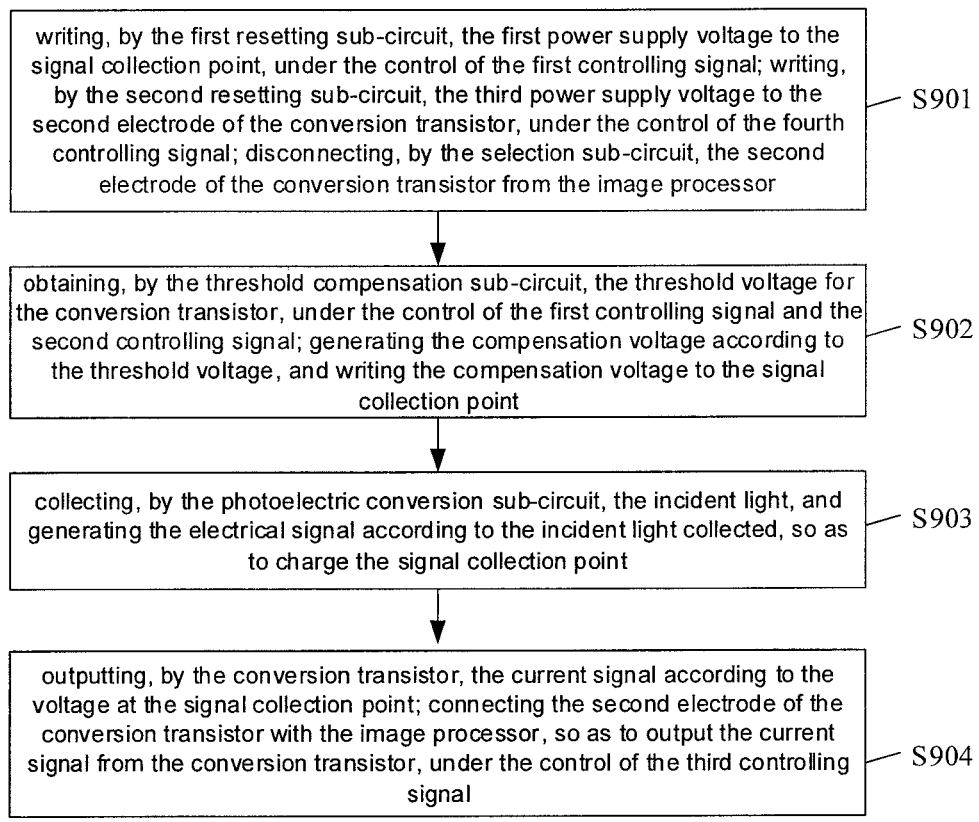
FIG. 9 shows a flow chart illustrating the method for driving the pixel sensing circuit according to another embodiment of the present disclosure.

FIG. 9 shows a flow chart illustrating the method for driving the pixel sensing circuit according to another embodiment of the present disclosure. The pixel sensing circuit of this embodiment includes a second resetting sub-circuit. As shown in FIG. 9, the driving method of the pixel sensing circuit may include the following steps.

In step S901, the first resetting sub-circuit writes the first power supply voltage to the signal collection point, under the control of the first controlling signal. The second resetting sub-circuit writes the third power supply voltage to the second electrode of the conversion transistor, under the control of the fourth controlling signal. The selection sub-circuit disconnects the second electrode of the conversion transistor from the image processor, under the control of the third controlling signal.

In step S902, the threshold compensation sub-circuit obtains the threshold voltage for the conversion transistor, under the control of the first controlling signal and the second controlling signal; generates the compensation voltage according to the threshold voltage, and writes the compensation voltage to the signal collection point.

In step S903, the photoelectric conversion sub-circuit collects the incident light, and generates the electrical signal according to the incident light collected, so as to charge the signal collection point.

In step S904, during the outputting phase, the conversion transistor outputs the current signal according to the voltage at the signal collection point; and connects the second electrode of the conversion transistor with the image processor, under the control of the third controlling signal, so as to output the current signal from the conversion transistor.

The detailed description of the foregoing steps S901 to S904 can refer to the corresponding content in the foregoing embodiment, and thus, details are not described herein again.

An embodiment of the present disclosure also provides an image sensor, comprising the pixel sensing circuit in accordance with the above embodiments; and the image processor.

The image sensor may further include peripheral circuits such as a row driving circuit, a column driving circuit, an amplifying circuit, and a preprocessing circuit. The pixel unit array and the peripheral circuit may be formed on a silicon substrate, for example, by a semiconductor integrated circuit fabrication process (for example, a CMOS integrated circuit fabrication process), wherein the sililcon substrate may be, for example, a single crystal silicon substrate or a silicon-on-insulator (SOI) substrate, and the like.

Embodiments of the present disclosure also provide an electronic device including the image sensor in accordance with the embodiments of the present disclosure. The electronic device can be a digital camera, a mobile phone, a tablet, a laptop, or the like.

It is to be understood that the above embodiments are merely exemplary embodiments employed to explain the principles of the present disclosure, but not limit the present disclosure. Various modifications and improvements can be made by those skilled in the art without departing from the spirit and scope of the disclosure, and such modifications and improvements are also considered to be within the scope of the disclosure.

I claim:

1. A pixel sensing circuit, comprising:
  a photoelectric conversion sub-circuit electrically coupled to a signal collection point and configured to collect an incident light, and generate an electrical signal based on the incident light collected, so as to charge the signal collection point;
  a first resetting sub-circuit electrically coupled to a first controlling signal line and a first power supply terminal and configured to write a first power supply voltage from the first power supply terminal to the signal collection point, under a control of a first controlling signal from the first controlling signal line;

a conversion transistor having a control electrode electrically coupled to the signal collection point, a first electrode electrically coupled to the first power supply terminal, and a second electrode, wherein the conversion transistor is configured to output a current signal at the second electrode according to a voltage at the signal collection point;

a threshold compensation sub-circuit electrically coupled to the first controlling signal line, a second controlling signal line, a second power supply terminal, and the second electrode of the conversion transistor, wherein the threshold compensation sub-circuit is configured to obtain a threshold voltage of the conversion transistor under a control of the first controlling signal and a second controlling signal from the second controlling signal line, generate a compensation voltage according to the threshold voltage, and write the compensation voltage to the signal collection point; and a selection sub-circuit electrically coupled to the second electrode of the conversion transistor and a third controlling signal line, and configured to output a current signal from the second electrode of the conversion transistor under a control of a third controlling signal from the third controlling signal line;

wherein the threshold compensation sub-circuit comprises: a second transistor, a third transistor, and a capacitor;

wherein the capacitor has a first terminal coupled to the signal collection point, and a second terminal coupled to a first electrode of the second transistor and a first electrode of the third transistor;

the second transistor has a control electrode electrically coupled to the first controlling signal line, and a second electrode electrically coupled to the second electrode of the conversion transistor; and the third transistor has a control electrode electrically coupled to the second controlling signal line, and a second electrode electrically coupled to the second power supply terminal.

2. The pixel sensing circuit of claim 1, wherein the first resetting sub-circuit comprises a first transistor having a control electrode electrically coupled to the first controlling signal line, a first electrode coupled to the first power supply terminal and a second electrode electrically coupled to the signal collection point.

3. The pixel sensing circuit of claim 1, wherein the selection sub-circuit comprises: a fourth transistor having a control electrode electrically coupled to the third controlling signal line, a first electrode electrically coupled to the second electrode of the conversion transistor, and a second electrode electrically coupled to an image processor.

4. The pixel sensing circuit of claim 1, further comprising: a second resetting sub-circuit electrically coupled to the second electrode of the conversion transistor, a fourth controlling signal line, and a third power supply terminal, and configured to write a third power supply voltage from the third power supply terminal to the second electrode of the conversion transistor under a control of a fourth controlling signal from the fourth controlling signal line.

5. The pixel sensing circuit of claim 4, wherein the second resetting sub-circuit comprises: a fifth transistor having a control electrode electrically coupled to the fourth controlling signal line, a first electrode electrically coupled to the second electrode of the conversion transistor, and a second electrode electrically coupled to the third power supply terminal.

6. An image sensor, comprising:
the pixel sensing circuit of claim 1; and
an image processor electrically coupled to the selection sub-circuit.

7. An electronic device, comprising the image sensor of claim 6.

8. A method of driving the pixel sensing circuit of claim 1, comprising:
during a first phase,
writing, by the first resetting sub-circuit, the first power supply voltage to the signal collection point, under the control of the first controlling signal; and
resetting, by the selection sub-circuit, the second electrode of the conversion transistor, under the control of the third controlling signal;
during a second phase,
obtaining, by the threshold compensation sub-circuit, the threshold voltage for the conversion transistor, under the control of the first controlling signal and the second controlling signal; generating the compensation voltage according to the threshold voltage; and writing the compensation voltage to the signal collection point;
during a third phase,
collecting, by the photoelectric conversion sub-circuit, the incident light, and generating the electrical signal according to the incident light collected, so as to charge the signal collection point; and
during a fourth phase,
outputting, by the conversion transistor, the current signal according to the voltage at the signal collection point; and
outputting, by the selection sub-circuit, the current signal from the conversion transistor, under the control of the third controlling signal.

9. The method of claim 8, further comprising, during the second phase, disconnecting, by the selection sub-circuit, the second electrode of the conversion transistor from the image processor, under the control of the third controlling signal.

10. A method of driving the pixel sensing circuit of claim 4, comprising:
during a first phase,
writing, by the first resetting sub-circuit, the first power supply voltage to the signal collection point, under the control of the first controlling signal;
writing, by the second resetting sub-circuit, the third power supply voltage to the second electrode of the conversion transistor, under the control of the fourth controlling signal;
disconnecting, by the selection sub-circuit, the second electrode of the conversion transistor from the image processor, under the control of the third controlling signal;
during a second phase,
obtaining, by the threshold compensation sub-circuit, the threshold voltage for the conversion transistor, under the control of the first controlling signal and the second controlling signal; generating the compensation voltage according to the threshold voltage, and writing the compensation voltage to the signal collection point;
during a third phase, collecting, by the photoelectric conversion sub-circuit, the incident light, and generating the electrical signal according to the incident light collected, so as to charge the signal collection point; and during a fourth phase, outputting, by the conversion transistor, the current signal according to the voltage at the signal collection point; and connecting the second electrode of the conversion transistor with the image processor, under the control of the third controlling signal, so as to output the current signal from the conversion transistor.

11. A method of driving the pixel sensing circuit of claim 5, comprising:

during a first phase, writing, by the first resetting sub-circuit, the first power supply voltage to the signal collection point, under the control of the first controlling signal;

writing, by the second resetting sub-circuit, the third power supply voltage to the second electrode of the conversion transistor, under the control of the fourth controlling signal;

during a second phase, obtaining, by the threshold compensation sub-circuit, the threshold voltage for the conversion transistor, under the control of the first controlling signal and the second controlling signal; generating the compensation voltage according to the threshold voltage, and writing the compensation voltage to the signal collection point;

during a third phase, collecting, by the photoelectric conversion sub-circuit, the incident light, and generating the electrical signal according to the incident light collected, so as to charge the signal collection point; and during a fourth phase, outputting, by the conversion transistor, the current signal according to the voltage at the signal collection point; and outputting, by the selection sub-circuit, the current signal from the conversion transistor, under the control of the third controlling signal.

* * * * *